May 24, 1932.  P. S. BAILEY  1,860,165
LIGHT PROJECTOR
Filed March 13, 1931
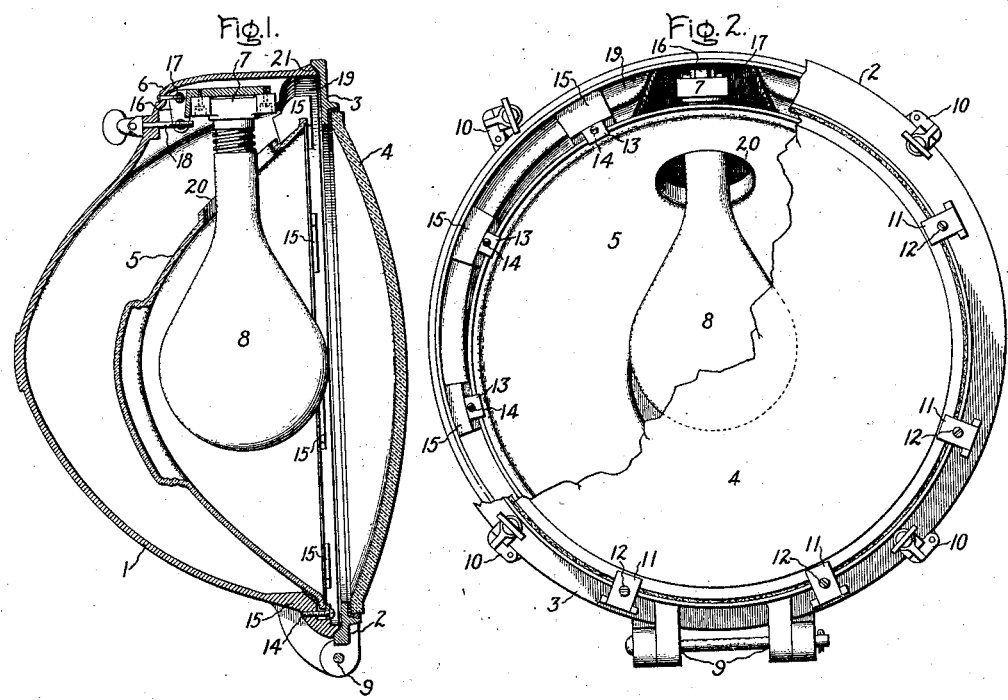
Inventor:
Percy S. Bailey,
by Charles E. Tuller,
His Attorney.

Patented May 24, 1932

1,860,165

UNITED STATES PATENT OFFICE

PERCY S. BAILEY, OF BEACH BLUFF, MASSACHUSETTS, ASSIGNOR TO GENERAL ELECTRIC COMPANY, A CORPORATION OF NEW YORK

LIGHT PROJECTOR

Application filed March 13, 1931. Serial No. 522,375.

The present invention relates to light projectors and especially to light projectors of considerable size, for example, of the size for 1000 or 1500 watt lamps or larger, although it is to be understood that the invention is not limited thereto.

The object of my invention is to provide an improved construction of casing and reflector arrangement for a projector which possesses advantages from a manufacturing standpoint and in appearance, and for a consideration of what I believe to be novel and my invention, attention is directed to the following specification and to the claims appended thereto.

In the drawings, Fig. 1 is a vertical sectional view of a light projector embodying my invention, and Fig. 2 is a face view thereof, a part of the cover being broken away to illustrate parts to the rear of the cover.

Referring to the drawings, 1 indicates the casing or housing of the projector; 2 indicates the cover comprising the ring 3 and the lens 4; 5 indicates the reflector, and 6 indicates the recess for housing the lamp socket 7 into which the lamp 8 is screwed. The cover 2 is hinged to the casing as is indicated at 9 and is adapted to be fastened in position over the casing by means of suitable screw clamps indicated at 10. The lens 4 is held in the cover ring 3 by means of suitable cleats 11 fastened by screws 12. The reflector is fastened in the casing by means of cleats 13 fastened by screws 14 to spaced projections 15 formed at the inner edge of the casing 1. The lamp socket is mounted on a bracket 16 carried on a hinge 17 on which it may be adjusted by means of a threaded rod 18, the threaded rod serving also to hold the bracket in adjusted position.

In connection with the construction of light projectors of the type illustrated it has heretofore been the practice to form the recess 6 for housing the lamp socket as a projection on the top of the casing, the projection having an integral front wall and showing from the front of the casing. This construction has the disadvantage from a manufacturing standpoint that when the casing is cast the forming of the recess requires the use of a core which adds to the cost of the casting operation. Also the projection on the casing, when viewed from the front, detracts from the appearance of the projector.

According to my invention, I construct the front of the casing 1 of a diameter such that it encloses or includes entirely the front of the projection 6, and I then mount the reflector eccentrically in the casing and correspondingly mount the lens 4 eccentrically in the door. With this arrangement the projector, when viewed from the front, is round in contour with the lens eccentrically located in it.

Referring particularly to the drawings, it will be seen that the recess 6 opens directly to the front of the casing as is indicated at 19. As a result of this arrangement the casing can be cast without the use of a core and the casing when cast can be removed directly from the mold. This decreases materially the cost of the molding operation. The reflector 5 is mounted eccentrically in the casing to an extent sufficient to provide room for the lamp socket, the reflector 5 having an opening 20 through which the neck of the lamp 8 extends, and the lens 4 is mounted eccentrically in the cover so as to be concentric with the reflector.

The casing is round at the front and is provided with a beveled surface 21 against which a beveled surface on the cover fits. This arrangement has the advantage that the beveled surface may be machined around the periphery of the casing, and a similar surface may be machined on the door, which means that the door can be readily fitted, and when clamped in position tends to become tighter with increased pressure caused by setting up the latching clamps 10 tighter.

By my invention, I am enabled to manufacture the construction at lower cost without detracting from the serviceability of the construction, and at the same time provide a tighter fitting cover for the casing, and a more pleasing appearance for the unit as a whole.

What I claim as new and desire to secure by Letters Patent of the United States, is:—

1. In a projector, a tapered casing which terminates at its forward end in a circular open side, a projection formed integral with the casing to provide a recess for the reception of a lamp support, said projection at its forward end being located within the contour of the circular open side of the casing whereby said recess at its forward end opens into said circular open side, a circular cover for the casing, a reflector mounted eccentrically in said casing, and a lens for the reflector mounted eccentrically in the cover concentric with said reflector, said cover closing the open side of the casing and the recess.

2. In a projector, a tapered casing which terminates at its forward end in a circular open side, a projection formed integral with the casing to provide a recess for the reception of a lamp support, said projection at its forward end being located within the contour of the circular open side of the casing whereby said recess at its forward end opens into said circular open side, and said casing having a beveled surface surrounding the open side, a circular cover for the casing having a beveled surface which engages the beveled surface of the casing, a reflector mounted eccentrically in said casing, and a lens for the reflector mounted eccentrically in said cover concentric with said reflector, said cover closing the open side of the casing and the recess.

In witness whereof I have hereunto set my hand.

PERCY S. BAILEY.